UNITED STATES PATENT OFFICE.

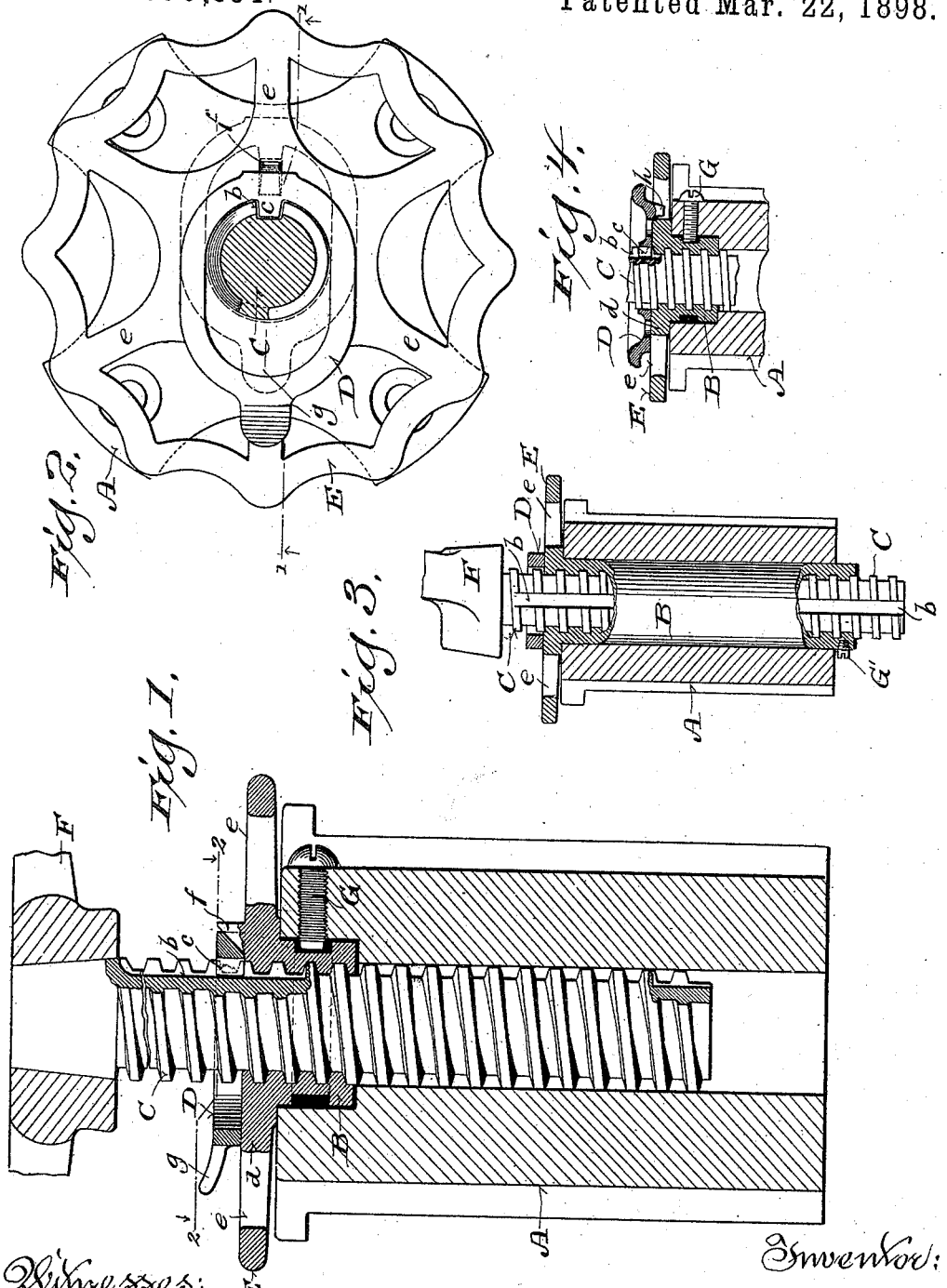

HARRY W. BOLENS, OF PORT WASHINGTON, WISCONSIN.

CHAIR.

SPECIFICATION forming part of Letters Patent No. 600,854, dated March 22, 1898.

Application filed July 6, 1897. Serial No. 643,506. (No model.)

*To all whom it may concern:*

Be it known that I, HARRY W. BOLENS, a citizen of the United States, and a resident of Port Washington, in the county of Ozaukee and State of Wisconsin, have invented certain new and useful Improvements in Chairs; and I do hereby declare that the following is a full, clear, and exact description thereof.

My invention has for its object to simplify and cheapen the manufacture of that class of chairs in which vertically-adjustable revoluble seat-supports are embodied; and it consists in certain peculiarities of construction and combination of parts hereinafter set forth with reference to the accompanying drawings and subsequently claimed.

Figure 1 of the drawings represents a view of an improved construction and arrangement of parts according to one form of my invention, certain of these parts being in vertical transverse section, as indicated by line 1 1 in the succeeding figure; Fig. 2, a plan view, partly in horizontal section, on the plane indicated by line 2 2 in the preceding figure; Fig. 3, a partly vertical transverse sectional view of a construction and arrangement of parts constituting another form of my invention, and Fig. 4 a similar view of still another form of said invention.

Referring by letter to the drawings, A represents a smooth-bore chair-base casting, and B a nut that has bearing contact with the casting, preferably within the same, so as to economize space. Engaging the nut is a screw-spindle C, having a longitudinal groove $b$, engaged by a spline $c$, extending inward from a slip-collar D, that surrounds the spindle above the nut-thread. The slip-collar is normally held to rotate with the nut, and various means for accomplishing this result may be utilized.

The slip-collar being in spline engagement with the spindle and held to rotate with the nut in bearing contact with a stationary base-casting, all three of the former parts may turn together without disturbing vertical adjustment of said spindle, to which the seat-frame spider F of a chair is rigidly connected; but if said collar be adjusted so as to bring its spline out of the spindle-groove or to prevent its rotation with said nut the latter may be operated to serve its function as a means for raising or lowering the aforesaid spindle.

To prevent the nut from being lifted away from the base-casting, any suitable retaining means may be employed, and this feature of the construction and arrangement of parts is hereinafter more particularly set forth.

The nut B is shown as having an upper annular flange $d$, from which the spokes $e$ of a hand-wheel E radiate, and as shown in Fig. 1 the flange may be the only part of said nut in bearing contact with the base-casting. In Fig. 4 the lower end of the nut is shown in bearing contact with the base-casting, and the latter figure also shows the nut-flange $d$ in like contact with said base-casting. Hence it is to be understood that it is practical to have either or both of these nut-surfaces bear upon the aforesaid base-casting. In Figs. 1 and 4 the vertical portion of the nut is shown out of frictional contact with the chair-base casting.

The slip-collar shown in Figs. 1, 2, and 3 is of elliptical shape and has such area of aperture as will permit its longitudinal adjustment to bring the spline $c$ out of engagement with the spindle-groove and back of the vertical face of a bevel-top lug $f$, extended upward from the nut, the latter and the lug being preferably cast in one piece. The elliptical slip-collar is provided with a beveled notch for the engagement of the nut-lug $f$, and said collar is also shown as having a handle $g$, by which it may be conveniently adjusted. A sliding movement of the elliptical slip-collar from the position shown in full lines, Figs. 1 and 2, will cause its notched portion to ride upon the nut-lug $f$ until the spline $c$, thus disengaged from the spindle-groove, drops back of said lug, as shown by dotted lines in said Fig. 2. The slip-collar being in the position last described, it may rotate with the nut when the latter is operated to vertically adjust the spindle, it only requiring one hand of the operator to effect this adjustment after said collar has been positioned so as to lock its spline out of engagement with the spindle-groove. However, one hand may be employed to lift and hold the slip-collar clear of the lug on the nut while the latter is being operated by the other hand to vary vertical adjustment of the spindle, and in this case it is not necessary to disengage the collar-spline from the spindle-groove.

In Fig. 4 the slip-collar D is shown as having the form of a washer provided with a depending lug $h$, that normally comes between spokes of the hand-wheel portion E of nut B, whereby said collar, having its spline engaged with the longitudinal groove of the spindle, is held to rotate with the latter and said nut. By lifting and holding the latter form of slip-collar so as to have its lug $h$ free of the nut rotation of the latter will effect vertical adjustment of the spindle.

In Figs. 1 and 4 a short nut B is shown engaging a counterbore at the upper end of the chair-base casting, and this form of nut is also shown as being provided with an exterior annular groove engaged by a screw G, adjustable in said chair-base casting. By having the screw engaged with the groove of the nut the latter cannot be lifted away from the chair-base casting.

In Fig. 3 the nut is shown long enough to extend down through the bore of the chair-base casting, and a screw G' run into the lower projecting portion of this latter form of nut serves to prevent lift of the same from said casting.

In any form of my invention the construction and arrangement of parts are very economical owing to the simplicity of the structure.

It is also to be observed that the seat and base portions of a chair embodying my invention may be readily separated for knockdown shipment, and there are no parts liable to be lost at any time from said chair.

Having thus described my invention, what I claim as new, and desire to secure by Letters Patent, is—

1. A chair-base casting, a nut in bearing contact with the casting, a longitudinally-grooved screw-spindle engaging the nut, a slip-collar above the nut-thread having a spline engaging the spindle-groove, and suitable means whereby the slip-collar is normally held to rotate with said nut.

2. A chair-base casting, a rotative nut having bearing contact with the casting inside the same, a longitudinally-grooved screw-spindle engaging the nut, a slip-collar above the nut-thread having a spline engaging the spindle-groove, and suitable means whereby the slip-collar is normally held to rotate with said nut.

3. A chair-base casting, a nut in bearing contact with the casting, suitable means for preventing lift of the nut from said casting, a longitudinally-grooved screw-spindle engaging said nut, a slip-collar above the nut-thread having a spline engaging the spindle-groove, and suitable means whereby the slip-collar is normally held to rotate with the aforesaid nut.

In testimony that I claim the foregoing I have hereunto set my hand, at Milwaukee, in the county of Milwaukee and State of Wisconsin, in the presence of two witnesses.

HARRY W. BOLENS.

Witnesses:
N. E. OLIPHANT,
B. C. ROLOFF.